UNITED STATES PATENT OFFICE.

OSCAR MUELLER, OF BUFFALO, NEW YORK, ASSIGNOR TO SCHOELLKOPF, HARTFORD & HANNA COMPANY, OF BUFFALO, NEW YORK.

BLACK DYE AND PROCESS OF MAKING SAME.

SPECIFICATION forming part of Letters Patent No. 688,478, dated December 10, 1901.

Application filed March 18, 1901. Serial No. 51,742. (Specimens.)

*To all whom it may concern:*

Be it known that I, OSCAR MUELLER, a subject of the German Emperor, and a resident of Buffalo, in the county of Erie and State of New York, have invented a new and useful Improvement in Dark Dyes and Methods of Making Same, of which the following is a specification.

My invention relates to a dye or coloring-matter which dyes unmordanted cotton dark shades, such as black, black with a blue, green, or violet shade, or dark blue, green, or violet.

I have found that by coupling one molecule of the tetrazo compound of a paradiamin—for instance, benzidin, tolidin, or dianisidin—with one molecule of amidonaphtholdisulfo-acid H in a weakly-acidulated solution an intermediate product is formed which is capable of taking up one molecule of a diazo compound in an alkaline solution. The new body so formed is represented by the general formula

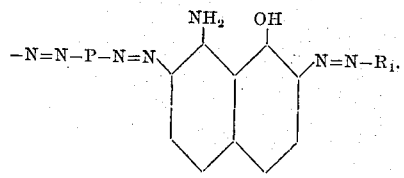

In this formula P represents diphenyl or its homologue, and R an aromatic radical.

This new body may be coupled with amins or phenols, forming dyestuffs of great coloring power.

Example: 18.4 pounds of benzidin are tetrazodized in the usual manner. The solution of the tetrazo compound is partially neutralized with acetate of soda, so that some free mineral acid remains. A neutralized solution of thirty-two pounds of amidonaphtholdisulfo-acid H is then added under stirring. After two hours a solution of sixteen pounds of crystallized acetate of soda is slowly added. The first intermediate product or substance so formed is mostly a precipitate of violet color. This is made alkaline by the addition of an excess of sodium carbonate, whereby a solution of violet color is formed. A solution of diazobenzene prepared from 9.3 pounds of anilin in the usual way is now quickly added, whereby a second intermediate substance is produced. This reaction is completed in from one to two hours and produces the second intermediate substance, as a precipitate of bluish-black color. A solution of 12.5 pounds of metatoluylenediamin is now added, whereby the dyestuff is quickly completed, forming a brownish-black solution. The latter is now heated and the dyestuff precipitated by common salt, filtered, and dried.

The dyestuff produced in this manner is a dark powder which is easily soluble in water, which it colors dark brown, and in concentrated sulfuric acid, which it colors bluish black, while it is not soluble in benzene or toluene. It dyes unmordanted cotton in a bath of Glauber salt a deep black with a bluish shade.

Instead of diazobenzene other diazo compounds of similar affinity or combining power can be employed. Instead of metatoluylenediamin other amins or phenols which combine, in the second place, with a tetrazo compound can be employed. Instead of tetrazodiphenyl other tetrazo compounds, such as tetrazoditolyl or tetrazodimethoxydiphenyl, may be employed. Metadiamin produces a deep black, phenol a greenish black or dark green, amidonaphtholsulfo-acid a bluish black, and naphtholsulfo-acid a violet black. The same result is obtained by combining the amin or phenol with the first intermediate product and then adding the diazo compound; but the first-described method is generally to be preferred.

I claim as my invention—

1. The herein-described new dyestuff, derived from amidonaphtholdisulfo-acid H and a tetrazo compound, represented by the general formula:

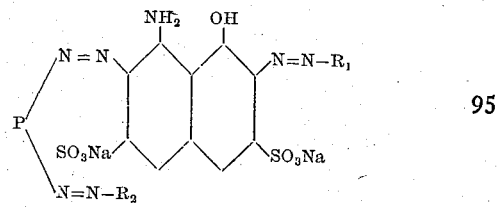

being a dark powder, soluble in water, which it colors dark brown to dark blue and dark green, soluble in concentrated sulfuric acid which it colors a bluish black, insoluble in benzene and toluene, and dying unmordanted cotton black with a blue to green shade, substantially as set forth.

2. The herein-described method of producing a dyestuff which consists in combining in an acidulated solution a tetrazo compound of a paradiamin with amidonaphtholdisulfo-acid and combining therewith in an alkaline solution a diazo compound and an aromatic radical capable of coupling with diazo compounds, thus forming azo dyes, substantially as set forth.

3. The herein-described method of producing an intermediate substance suitable for producing a dyestuff by combination with an aromatic radical capable of coupling with diazo compounds, thus forming azo dyes, which consists in combining in an acidulated solution a tetrazo compound with amidonaphthol-disulfo-acid and combining therewith in an alkaline solution a diazo compound, substantially as set forth.

Witness my hand this 15th day of March, 1901.

OSCAR MUELLER.

Witnesses:
  EDWARD WILHELM,
  CYESTA HORNBECK.

DISCLAIMER.

688,478.—*Oscar Mueller*, Buffalo, N. Y. BLACK DYE AND PROCESS OF MAKING SAME. Patent dated December 10, 1901. Disclaimer filed April 3, 1913, by the assignee, *Schoellkopf, Hartford & Hanna Company.*

Enters its disclaimer—

"From said claim 1 of any and all dyestuffs in which $-N=N-R_1$ of the formula of said claim would stand for or represent diazotized acetyl-paraphenylene-diamin or diazotized acetyl-naphthalene-diamin, or diazotized naphthylamin, or any other substance containing the acetyl amido group ($NH\ COCH_3$) or the naphthyl radical."

Also enters its disclaimer—

"From claims 2 and 3 of said patent of all processes in which the 'diazo compound' is a diazo compound of acetyl-paraphenylene-diamin or of acetyl-naphthalene-diamin, or of naphthylamin, or of any other substance containing the acetyl amido group $NH\ COCH_3$, or the naphthyl radical."—[*Official Gazette, April 8, 1913.*]